United States Patent Office 3,726,843
Patented Apr. 10, 1973

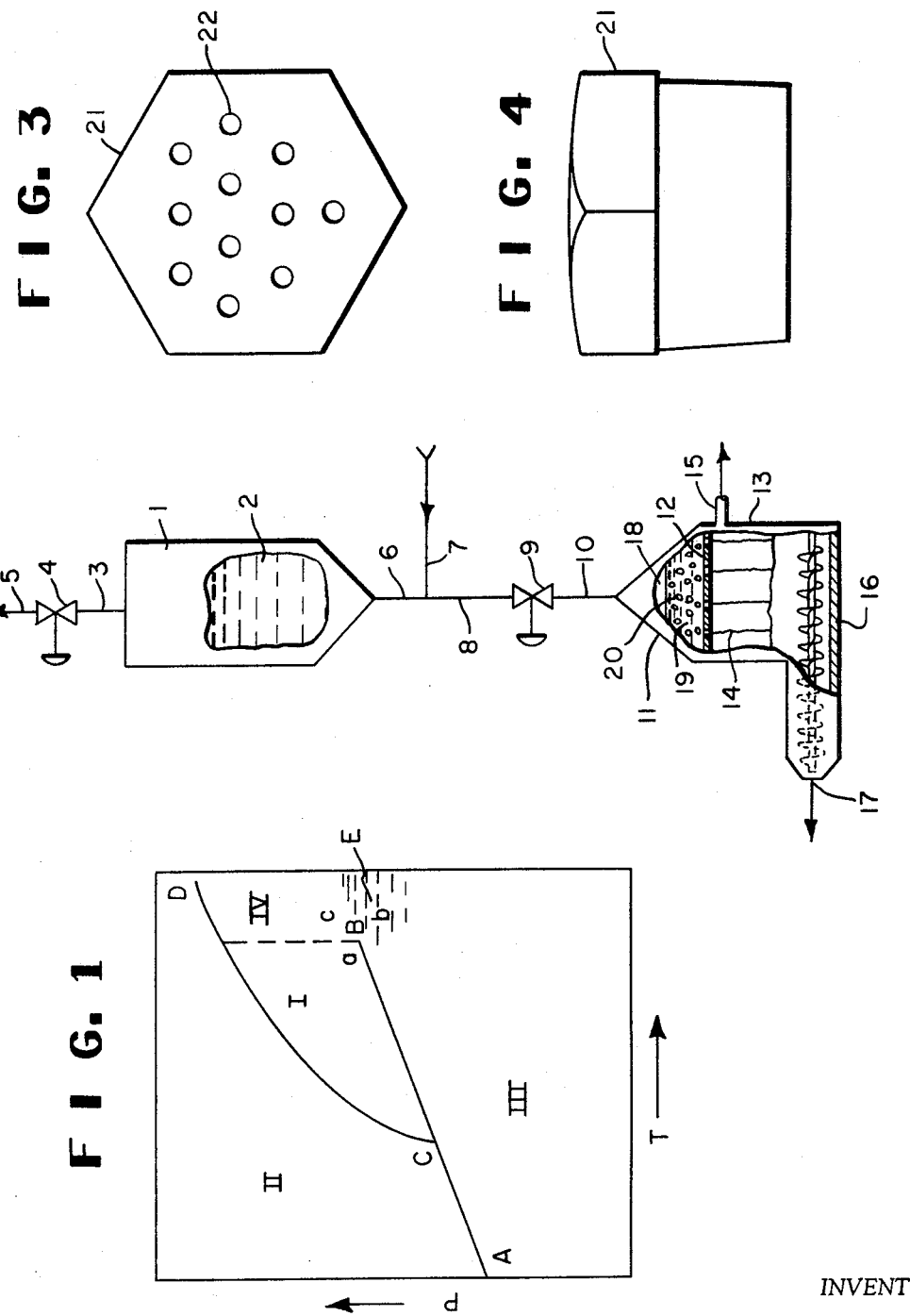

3,726,843
PROCESS FOR ISOLATING EPDM ELASTOMERS FROM THEIR SOLVENT SOLUTIONS
Colin Anolick, Louisville, Ky., and Edgar W. Slocum, Wilmington, Del., assignors to E. I. du Pont de Nemours and Company, Wilmington, Del.
Filed Nov. 3, 1970, Ser. No. 86,562
Int. Cl. C08f 15/40
U.S. Cl. 260—80.78                    17 Claims

ABSTRACT OF THE DISCLOSURE

In a continuous process for recovering an amorphous hydrocarbon copolymer of ethylene from solution by heating the solution at superatmospheric pressure to form two liquid phases, a solvent phase and a copolymer-rich phase, and separating the phases, the improvement of continuously passing the copolymer-rich phase into an intermediate lower pressure zone under substantially adiabatic conditions and then extruding the resulting copolymer-rich phase at a controlled rate into a vaporization zone under substantially adiabatic conditions to vaporize residual solvent and form the copolymer into solid bodies.

---

This invention relates to the isolation of amorphous hydrocarbon copolymers of ethylene from their solutions.

It is known that amorphous hydrocarbon copolymers can be prepared by copolymerizing ethylene and at least one other alpha-monoolefin or hydrocarbon diene in solution in the presence of a catalyst. U.S. 3,496,135 to Caywood describes a process for separating and isolating such a copolymer from a solvent by heating the copolymer solution under pressure to form two liquid phases, a copolymer-rich phase and a solvent phase and then separating the two phases by decantation. The liquid solvent phase is removed through a pressure letdown valve and passes into a reservoir where it is cooled for reuse. The copolymer-rich phase containing a residual amount of solvent is removed through a pressure letdown valve and is directed into a flashing chamber maintained at a low pressure. Residual solvent in the copolymer-rich phase is reduced to a desirable level by flashing and the remaining copolymer can be conveniently removed from the flash chamber by a screw extruder.

A problem experienced in such a single stage recovery process is that dry copolymer is often produced in an undesirable particulate form, referred to as "fines" rather than as "an agglomerated mass." This occurs most frequently at high production rates. Fines are bothersome because they can become entrained and lost in the vapor solvent leaving the flashing chamber and also cause equipment fouling such as blockage of the vapor lines from the flash chamber. They are also subject to being blown about and form a dust and health hazard.

This invention provides an improvement in the continuous decantation process for isolating an amorphous hydrocarbon copolymer of ethylene and at least one other ethylenically unsaturated monomer from solution whereby temperature of and pressure on the solution is adjusted to form two liquid phases, a solvent phase and a copolymer-rich phase, the copolymer-rich phase is separated from the solvent phase by decantation and the remaining solvent is evaporated from the copolymer-rich phase. The improvement consists essentially of continuously passing the copolymer-rich phase under substantially adiabatic conditions into an intermediate lower-pressure zone maintained at a superatmospheric pressure low enough to vaporize sufficient solvent to maintain a solvent vapor phase in the zone, and extruding the resulting copolymer-rich phase accompanied by the already vaporized solvent, from this intermediate zone under substantially adiabatic conditions into a subatmospheric pressure zone at a rate below that at which fines are formed, said zone having a temperature and pressure which volatilizes residual solvent in the copolymer-rich phase.

The apparatus of this invention comprises:

(a) a decanter for separating a copolymer-rich liquid phase from a solvent liquid phase at elevated temperature and pressures with an associated pressure letdown valve connecting the lower part of the decanter with (b) an intermediate pressure chamber having an inlet communicating with the aforesaid pressure letdown valve and having one or more exit ports leading to a vaporization chamber and sufficiently constricted to provide back pressure differential between the two chambers, and adapted to extrude the contents of the lower portion of the intermediate pressure chamber into a (c) solvent vaporizing chamber positioned to receive extrudate from the intermediate pressure chamber and permit substantially complete vaporization and removal of residual solvent from the extruded copolymer.

In the drawings:

FIG. 1 is a polymer/solvent phase diagram.
FIG. 2 is a flow diagram illustrating typical process and apparatus embodiments of this invention.
FIG. 3 is a plan view of one embodiment of a bank of nozzles useful for extruding copolymer/solvent mixture into filaments.
FIG. 4 is a side view of FIG. 3.

DETAILS OF THE INVENTION

The invention is useful for recovering from solution amorphous ethylene hydrocarbon copolymers generally and particularly ethylene/propylene, ethylene/diene and ethylene/propylene/diene (EPDM) amorphous copolymers. The copolymers can be prepared by conventional polymerization procedures for ethylene and at least one other ethylenically unsaturated monomer. In practicing the invention a copolymer solution, usually containing about 2–20% copolymer, is heated under pressure to a temperature and pressure sufficient to form two liquid phases. One phase, referred to as the "solvent phase," is practically entirely solvent, although it usually contains a small amount of copolymer, and the other is a copolymer-rich solvent solution which usually contains about 20–60 weight percent copolymer depending on the initial solution composition and the decantation conditions utilized. The particular temperature and pressure will vary with the type and concentrations of copolymer and solvent present, but they are selected so that both the copolymer rich phase and the solvent phase behave as liquids. Conventional phase diagrams for particular polymers and solvents can be used for determining the most advantageous temperatures and pressures for specific operations.

For example, FIG. 1 is a phase diagram showing the manner in which temperature (T) and pressure (P) affect the behavior of a solution of an ethylene/propylene/1,4-hexadiene copolymer in n-hexane. The diagram shows lines AB and CD dividing the graph into three zones—I, II and III. B is the critical point. Within Zone I, the polymer solution forms two liquid phases, one phase of practically pure liquid solvent and a second phase of polymer-rich solution containing about 20–60 weight percent polymer.

Within Zone II a single liquid phase exists, and within Zone III, a vapor phase of solvent and a semi-solid phase of polymer containing residual solvent exist. Zone IV can be considered as part of Zone I because two phases exist, but these are "liquid-like" phases; the solvent phase, being above its critical temperature, has most of the properties of a liquid except that of constant volume. The area E indicated by broken lines is a transitional area between Zones IV and III and can be used for decantation purposes. The points $a$, $b$ and $c$ represent preferred phase conditions of about equal utility for decantation separation of a copolymer-rich phase from a solvent phase in accordance with this invention.

In carrying out the process of this invention, the temperature and pressure of a copolymer solution are adjusted to form two liquid phases (or "liquid-like" phases) as indicated by Zones I and IV in FIG. 1. The temperature is preferably somewhat above the critical temperature and the pressure can be above or below the critical pressure. According to this invention the polymer-rich solution produced by such a liquid phase separation can be processed in a very efficient manner to free the polymer from the residual solvent. This is accomplished by reducing the pressure on the copolymer-rich phase in two stages while removing vaporized solvent from the second stage only, thereby producing agglomerated solid polymer pellets or strands pratically free of solvent. Thus the copolymer-rich solution resulting from the liquid phase decantation at superatmospheric temperature and pressure is first passed into an intermediate lower pressure zone and the resulting copolymer-rich phase is then extruded into a vaporization zone having a still lower pressure and a high enough temperature to effect vaporization of residual solvent. Preferably the pressure is reduced adiabatically in each stage.

The specific pressure within the intermediate pressure zone in any given case will of course depend upon the copolymer and solvent being separated. For normal operations the intermediate zone pressure will be above atmospheric pressure and preferably about 5–10 atmospheres but in any event sufficiently below decanter pressure to avoid the extrusion of the fine particles of copolymer into the vaporization zone. Fine particles, sometimes simply called "fines," are discrete particles small enough to be entrained by vapor leaving the vaporization chamber. The avoidance of such fines during extrusion is an important objective of this invention.

Effective operating conditions under which an ethylene copolymer is substantially completely isolated from solvent is easily achieved according to this invention by starting with a decanter containing a copolymer-rich phase and a solvent vapor phase, maintained in accordance with the phase diagram of FIG. 1, desirably at 130°– 250° C. and 30–40 atmospheres and preferably at 180°– 250° C. at these pressures. The vaporization zone is maintained at a pressure below atmospheric and preferably at about 10–300 mm. of mercury absolute. The valve connecting the decanter with the intermediate pressure zone is then slowly opened as required to extrude solid copolymer at the desired rate into the vaporization zone with the maximum rate being limited by the valve opening at which fines begin to be formed. In some instances the extrudate is in the form of strands (e.g., continuous filaments or staple fibers) and sometimes in the form of pellets, depending upon the condtions used. In any case there will be a range of valve settings (e.g., extrusion rates) up to a maximum which will produce solid copolymer bodies of sufficient size to fall to the bottom of the vaporization zone and without the formation of fines. Thus the attainment of optimum satisfactory operating condtions in any case is achieved readily by slowly opening the decanter outlet valve to the maximum extent at which copolymer product in the desired form is attained in the volatilization chamber.

The term "liquid phase" as used herein also includes "liquid-like" phases in which the material can be handled like a liquid and possesses most of the properties of liquids except constant volume.

By way of illustration with reference to FIG. 2 an amorphous ethylene hydrocarbon copolymer in solution in hexane is heated under sufficient temperature and pressure to effect a separation into two liquid or liquid-like phases. The upper solvent phase is removed through conduits 3 and 5 and pressure letdown valve 4, and directed into a reservoir, not shown, for possible purification and reuse.

The copolymer-rich solution in the bottom of decanter 1, which is preferably operated liquid-full, is removed through conduit 6. If oil extension of the copolymer is desired, the oil can be added to the polymer-rich phase by conduit 7. Optionally, and not shown, the copolymer-rich solution and the oil can be added to a mixer and mixed before further processing.

Thereafter, the copolymer-rich solution passes through conduit 8, pressure letdown valve 9, and conduit 10 into intermediate pressure chamber 11, preferably under adiabatic conditions. The pressure in the intermediate pressure chamber is sufficiently lower than that in decanter 1 to promote substantial vaporization of solvent from the copolymer-rich solution, according to conventional thermodynamic principles, so that the intermediate pressure chamber contains a solvent vapor phase and a copolymer phase. The pressure in the intermediate pressure zone is superatmospheric but low enough relative to the pressure on the copolymer-rich solution feed to this zone that a solvent vapor phase is maintained in the intermediate zone during continuous operations. Normally a solvent vapor pad forms above the copolymer-rich phase in the intermediate zone but not necessarily so; the solvent vapor phase can be contained within the copolymer phase.

The introduction of the copolymer-rich phase into the intermediate pressure chamber 11 is preferably achieved under adiabatic conditions although not necessarily so. Any advantage accruing from cooling or heating this chamber would normally not warrant the added expense. Typical operation of the process is illustrated in FIG. 2. In the intermediate pressure chamber 11, the copolymer-rich phase 19 is shown as a continuous phase containing a discontinuous phase 20 of solvent vapor bubbles; at the top of the chamber a continuous vapor phase or pad 18 is formed in this particular embodiment. As the copolymer-rich phase 19 in the intermediate pressure chamber 11 is extruded, preferably under adiabatic conditions, through a bank of nozzles 12 into elongated bodies 14 in chamber 13, the already vaporized solvent from chamber 11 is recovered (perhaps by entrainment) along with the residual solvent vaporized from the copolymer extrudate. After the vapor phase pad 18 is established in chamber 11, further solvent vapor does not accumulate therein and the vapor pad 18 does not expand unduly or disappear. Pressure in chamber 13 is generally less than 760 mm. absolute, preferably 10–300 mm. absolute, so that solvent is removed practically entirely from the polymer as the filaments are formed. Solvent vapor is removed by vent 15 for reuse. Additionally or alternatively elevated temperatures can be used to vaporize solvent in chamber 13. Copolymer filaments collect in the bottom of solvent vaporization chamber 13 where they agglomerate and are removed through exit port 17 by conventional means such as extruder 16.

Although it is preferable to extrude the copolymer containing residual solvent into the solvent vaporization zone under adiabatic conditions, it is not necessary to maintain such conditions. Heat can be added to this zone to aid in volatilizing solvent and indeed heat can be used as the main volatilization agent along with a sufficiently lower pressure to effect extrusion of the copolymer. In a preferred embodiment, however, reduced pressures alone are relied upon solely in the vaporization chamber 13 to effect extrusion of the copolymer at a practical rate and to remove solvent therefrom.

The extruded copolymer is usually in elongated form such as a strand, film, fiber or filament particularly if the smallest dimension is of the order of a millimeter or less. Naturally the cross-section configuration and size of the extrudate will depend upon the shape of the extrusion orifice and its size respectively. If the orifice is relatively large as for example about three millimeters or more in diameter, an extrudate in the form of cubes or cylinders of the copolymer will be of sufficient size and weight to fall to the bottom of the volatilization chamber and avoid being entrained with solvent vapor leaving the chamber, thus satisfying an object of this invention. Usually the copolymer extrudate is in filamentary form of about 1–10 millimeters in diameter and about 5–125 millimeters in length; preferably about 2–5 millimeters in diameter and 10–100 millimeters in length or longer.

The nozzles 12 can be conventional nozzles useful for spinning polymers into fibers.

FIGS. 3 and 4 illustrate a useful nozzle in which hexagonal member 21, shaped to fit closely into the upper portion of solvent vaporizing chamber 13, contains holes 22. Other useful nozzle configurations include multiple slots and tapered holes. The number and spacing of the nozzles is a compromise between the economic use of the space available and providing sufficient space between the elastomeric filaments for the escape of the solvent vapor. For round nozzles the spacing between nozzle centers is preferably at least two times the diameter of the nozzle opening. Round nozzles of uniform size are preferred.

The copolymers useful in this invention are substantially amorphous by X-ray analysis and can be prepared by solution polymerization in organic solvents. Thus the copolymers form vulcanizates having rubber-like elasticity. It is the polymerization reaction product mixture comprising a 2–20% by weight organic solvent solution of the copolymer which is normally the starting material of this invention. Representative of these solvents are hexane, pentane, heptane and similar hydrocarbon solvents as well as non-hydrocarbon solvents of similar volatility and which are suitable for preparing the ethylene copolymers of this invention. Thus chlorinated and fluorinated hydrocarbons and solvents are useful. In general, the useful solvents are those useful for such polymerizations and having an upper consolute temperature lower than the decomposition temperature of the particular polymer and solvent utilized in a given instance.

The copolymers recovered from solution in accordance with this invention are elastomeric hydrocarbon copolymers of ethylene and at least one other hydrocarbon monomer such as a ($C_3$–$C_8$) alpha-olefin or a ($C_6$–$C_{22}$) non-conjugated diene. Representative alpha-olefins include propylene, 1-butene, 1-pentene, 1-hexene, etc. The non-conjugated dienes can be open-chain or cyclic compounds having only one polymerizable double bond in the sense that only one double bond of the diene reacts to a substantial degree in forming the polymer backbone of a polymer prepared by conventional procedures. Terminal double bonds and the endocyclic double bond at the 2-position in unsaturated derivatives of 2-norbornene are typical of such active bonds. The open-chain dienes correspond to the formula

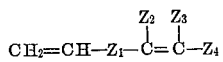

wherein $Z_1$ is $C_1$–$C_8$ alkylene and $Z_2$, $Z_3$ and $Z_4$ are independently hydrogen or an alkyl radical, with the proviso that the Z groups indicated in said formula are selected such that the diene has from about 6 to 22 carbon atoms. Representative dienes are 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 12-n-butyl-1,12-heptadecadiene; and 15-ethyl-1,15-heptadecadiene. Open-chain dienes having two terminal non-conjugated carbon-to-carbon double bonds, where $Z_2$, $Z_3$ and $Z_4$ are hydrogen, e.g. 1,5-hexadiene or 1,4-pentadiene, can be used but are much less preferred. Cyclic non-conjugated dienes include dicyclopentadiene, 5-alkenyl-substituted-2-norbornenes, e.g., 5-(2'-butenyl)-2-norbornene, 5-alkylidene - 2 - norbornenes (including ethylidene-2-norbornenes and 5-methylene-2-norbornene), 2-alkyl-2,5-norbornadiene (e.g., 2-ethyl - 2,5 - norbornadiene), and 1,5-cyclooctadiene. The preferred diene is 1,4-hexadiene, particularly in the terpolymer ethylene/propylene/1,4-hexadiene, because of its outstanding physical properties.

Representative elastomeric polymers made from the above-described alpha-monoolefins and non-conjugated dienes and methods for their preparation are disclosed in U.S. Pats. 2,933,480; 3,093,620; 3,093,621 and 3,300,459.

Conventional processing oil and other additives can be used to extend the polymers of this invention. Petroleum-derived oils and other oils useful in extending EPDM copolymers can be used.

All parts, proportions and percentages disclosed herein are by weight unless otherwise indicated.

The following examples illustrates this invention.

Example 1

An ethylene/propylene/1,4-hexadiene terpolymer (61/36/3) with a Mooney viscosity (ML–1+4/121° C.) of about 60 in solution in n-hexane containing 11.5 weight percent polymer is heated to a temperature of 237° C. under a pressure of 100–200 atmospheres. The solution is then passed at a rate of 182 kilograms per hour into a decanter, operated liquid full, maintained at a temperature of 237° C. and a pressure of 34 atmospheres. Residence time in the decanter is 3 minutes. In the decanter, phase separation occurs with almost pure n-hexane being drawn from the top of the decanter through a pressure letdown valve and into a receiver for reuse. A polymer-rich phase containing 50 weight percent polymer in solution in n-hexane settles to the bottom of the decanter and is withdrawn through a pressure letdown valve under adiabatic conditions into an intermediate pressure chamber maintained at a pressure of 7 atmospheres. In this chamber, according to thermodynamic calculations, part of the solvent is converted into vapor. Visual examination shows that during continuous operations the upper part of the chamber contains a relatively constant amount of n-hexane vapor and the lower portion of the chamber contains a polymer phase in which apparently some n-hexane vapor is contained. The polymer phase containing n-hexane is extruded adiabatically through three nozzles in parallel, each 3 millimeters in diameter and length and tapered on the downstream side at an angle of 60 degrees diverging in the downstream direction. The polymer emerges from these nozzles as continuous strands into a vaporization chamber where n-hexane is vaporized at a temperature of 210° C. and a pressure of 110 mm. absolute leaving the copolymer practically free from solvent.

The copolymer filaments collect as an agglomerated mass in the bottom of the chamber at a rate of 2.09 kilograms per hour with no fines being produced.

Example 2

The following table shows representative conditions for isolating a 60.5/36/3.5 ethylene/propylene/1,4-hexadiene copolymer from its n-hexane solution in accordance with this invention, without production of fines, using a variety of extrusion nozzles, temperature, pressure and extrusion rates. The vaporization zone pressure and temperature was 100 mm. Hg absolute and 210° C.

TABLE

Nozzle No.: Description
1 _____ ⅛″ diam. by ⅛″ deep. 6 nozzles
2 _____ ⅛″ diam. by ⅛″ deep—tapered downstream face. 1 nozzle
3 _____ ⅛″ diam. by ⅛″ deep—tapered downstream face. 3 nozzles
4 _____ ⅛″ diam. by ¹⁄₁₆″ deep—tapered downstream face. 3 nozzles
5 _____ ⅛″ slot by ⅛″ deep—0.5 in. long
6 _____ Deep ⅛″—tapered slots

| | Decanter | | Polymer Type [a] | | | | | |
|---|---|---|---|---|---|---|---|---|
| | | | A | | B | | C | |
| Nozzle No. | Temp., °C. | Press., atm. | Production,[b] kg./hr. in.² | Intermediate press., atm. | Production, kg./hr. in.² | Intermediate press., atm. | Production, kg./hr. in.² | Intermediate press., atm. |
| 1 | 240 | ~34 | 68 | 8.3 | | | | |
| 2 | 240 | ~34 | 77 | 9.5 | | | | |
| 3 | 240 | ~34 | >50 | 8.4 | | | | |
| 4 | 240 | ~34 | | | 73 | 6.8 | | |
| 5 | 240 | ~34 | 45 | 5 | | | 82 | 1.8 |
| 6 | 240 | ~34 | | | 32 | 7.1 | <52 | 4.9 |
| 4 | 224 | ~30 | | | 64 | 6 | | |
| 4 | 237 | ~34 | | | 73 | 6.8 | | |
| 4 | 252 | ~41 | | | 90 | 7.5 | | |

[a] Polymer A has a Mooney viscosity (ML-4/121° C.) of 40; Polymer B has a Mooney viscosity (ML-4/121° C.) of 60; Polymer C is a blend of 100 parts of Polymer B and 60 parts of petroleum oil.
[b] Production rate is based on orifice area and is the maximum achieved without production of fines.

We claim:

1. A process for recovering an amorphous hydrocarbon copolymer of ethylene from a solution containing about 20–60 weight percent of said copolymer, said solution being at superatmospheric pressure and at an elevated temperature, wherein entrainment of copolymer fines in solvent vapor is avoided by
   (a) passing said solution into an intermediate pressure zone maintained at a superatmospheric pressure below that of the initial solution, said intermediate pressure being low enough that sufficient solvent is vaporized to maintain vapor in the zone, without otherwise removing solvent vapor from the intermediate pressure zone,
   (b) extruding the resulting copolymer-rich phase together with the already vaporized solvent into a subatmospheric pressure zone at a rate below that at which copolymer fines are formed, said subatmospheric pressure zone having a pressure and temperature which volatilizes residual solvent in the copolymer-rich phase.

2. The process of claim 1 wherein steps (a) and (b) are accomplished under substantially adiabatic conditions.

3. The process of claim 2 wherein the copolymer is a copolymer of ethylene and propylene.

4. The process of claim 3 wherein the copolymer is a copolymer of ethylene, propylene, and a non-conjugated diene having only one polymerizable double bond.

5. The process of claim 4 wherein the non-conjugated diene is 1,4-hexadiene and the solvent is hexane.

6. The process of claim 4 wherein the non-conjugated diene is ethylidene norbornene.

7. In a continuous process for recovering an amorphous hydrocarbon copolymer of ethylene from a solution by heating the solution at superatmospheric pressure in an enclosed chamber to form a liquid solvent-rich phase and a liquid copolymer-rich phase containing about 20–60 weight percent copolymer, separating the liquid phases, and vaporizing residual solvent from the liquid copolymer-rich phase, the improvement whereby entrainment of copolymer fines in solvent vapor is avoided by
   (a) passing said copolymer-rich phase from said enclosed chamber into an intermediate pressure zone maintained at a superatmospheric pressure below that of said enclosed chamber, said intermediate pressure being low enough that sufficient solvent is vaporized to maintain a solvent vapor phase in the zone, and, without otherwise removing solvent vapor from the intermediate pressure zone,
   (b) extruding the resulting copolymer-rich phase together with already vaporized solvent into a subatmospheric pressure zone at a rate below that at which fines are formed, said subatmospheric pressure zone having a temperature and pressure which volatizes residual solvent in the copolymer-rich phase.

8. The process of claim 7 wherein steps (a) and (b) are accomplished under substantially adiabatic conditions.

9. The process of claim 8 wherein the copolymer is a copolymer of ethylene and propylene.

10. The process of claim 9 wherein the copolymer is a copolymer of ethylene, propylene, and a non-conjugated diene having only one polymerizable double bond.

11. The process of claim 10 wherein the non-conjugated diene is 1,4-hexadiene and the solvent is hexane.

12. The process of claim 10 wherein the non-conjugated diene is ethylidene norbornene.

13. The process of claim 8 wherein the initial ethylene copolymer solution contains about 2–20 weight percent copolymer, said enclosed chamber is maintained at about 180 to 250° C. and 30–40 atmospheric pressure, said intermediate pressure zone is maintained at about 3–11 atmospheres pressure, and said subatmospheric pressure zone is maintained at about 10–300 mm. absolute pressure.

14. The process of claim 13 wherein the copolymer is a copolymer of ethylene and propylene.

15. The process of claim 14 wherein the copolymer is a copolymer of ethylene, propylene, and a non-conjugated diene having only one polymerizable double bond.

16. The process of claim 15 wherein the non-conjugated diene is 1,4-hexadiene and the solvent is hexane.

17. The process of claim 15 wherein the non-conjugated diene is ethylidene norbornene.

References Cited

UNITED STATES PATENTS

| | | | |
|---|---|---|---|
| 1,440,026 | 12/1922 | Nilsson | 23—48 |
| 2,406,581 | 8/1946 | Bergstrom | 23—48 |
| 2,838,801 | 6/1958 | Long | 18—48 |
| 2,857,369 | 10/1958 | Johnson | 260—94.9 |
| 3,072,626 | 1/1963 | Cines | 260—93.5 |
| 3,227,784 | 1/1966 | Blades | 264—53 |
| 3,234,994 | 2/1966 | Dance | 159—47 |
| 3,244,688 | 4/1966 | Goins | 260—94.9 |
| 3,496,315 | 2/1970 | Caywood | 260—45.8 |
| 3,553,156 | 1/1971 | Anolick | 260—33.6 |
| 3,563,975 | 2/1971 | Zavasnik | 260—94.9 |

JAMES A. SEIDLECK, Primary Examiner

R. S. BENJAMIN, Assistant Examiner

U.S. Cl. X.R.

260—88.2 R; 94.9 F